(12) United States Patent
Rofougaran et al.

(10) Patent No.: US 8,289,212 B2
(45) Date of Patent: Oct. 16, 2012

(54) APPARATUS FOR POSITION DETECTION USING MULTIPLE ANTENNAS

(75) Inventors: Ahmadreza (Reza) Rofougaran, Newport Coast, CA (US); Maryam Rofougaran, Rancho Palos Verdes, CA (US); Nambirajan Seshadri, Irvine, CA (US); Brima B. Ibrahim, Aliso Viejo, CA (US); John Walley, Ladera Ranch, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/223,121

(22) Filed: Aug. 31, 2011

(65) Prior Publication Data

US 2011/0312421 A1 Dec. 22, 2011

Related U.S. Application Data

(63) Continuation of application No. 12/128,810, filed on May 29, 2008, now Pat. No. 8,031,121.

(60) Provisional application No. 60/936,724, filed on Jun. 22, 2007.

(51) Int. Cl.
*G01S 5/14* (2006.01)

(52) U.S. Cl. .......................................................... 342/458
(58) Field of Classification Search ................... 342/458
See application file for complete search history.

(56) References Cited

U.S. PATENT DOCUMENTS

| 3,430,243 | A | * | 2/1969 | Evans | 342/465 |
| 3,789,410 | A | * | 1/1974 | Smith et al. | 342/458 |
| 4,041,494 | A | * | 8/1977 | Ewen et al. | 342/458 |
| 6,760,387 | B2 | * | 7/2004 | Langford et al. | 375/267 |
| 7,495,614 | B2 | * | 2/2009 | Small | 342/458 |
| 8,031,121 | B2 | * | 10/2011 | Rofougaran et al. | 342/458 |
| 2002/0160840 | A1 | * | 10/2002 | Morkris et al. | 463/51 |

* cited by examiner

*Primary Examiner* — Gregory C Issing
(74) *Attorney, Agent, or Firm* — Garlick & Markison; Kevin L. Smith

(57) ABSTRACT

An apparatus includes a transmitter and a receiver device, which includes a receiver section and a processing module. The transmitter transmits a high carrier frequency signal. The receiver section includes first and second antennas that have an antenna radiation relationship for receiving the high carrier frequency signal. A receiver module of the receiver section determines first and second signal properties of the received high carrier frequency signal. The processing module determines a position of the receiver device with respect to the transmitter based on the first and second signal properties and maps the position to a coordinate system.

20 Claims, 11 Drawing Sheets

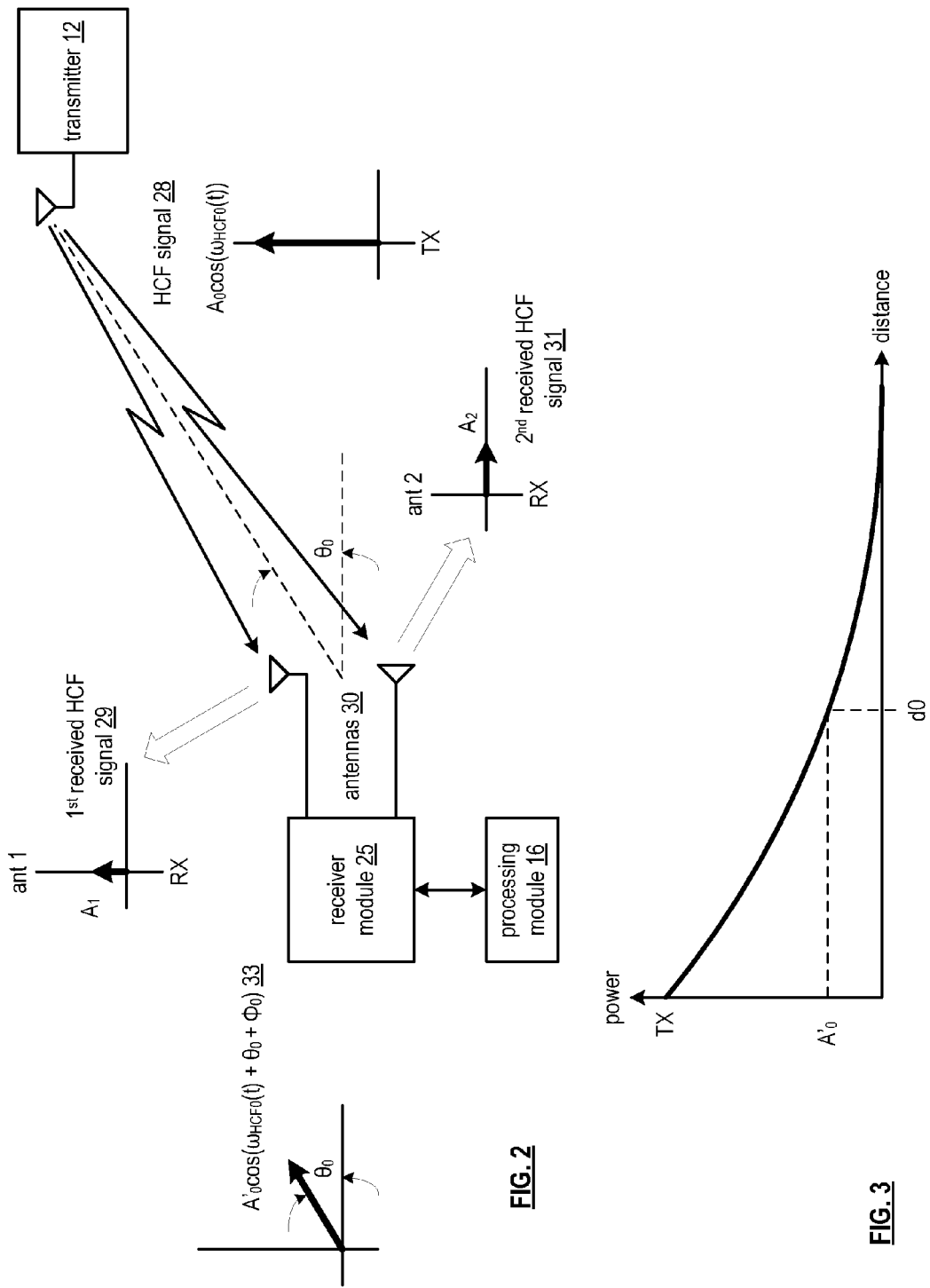

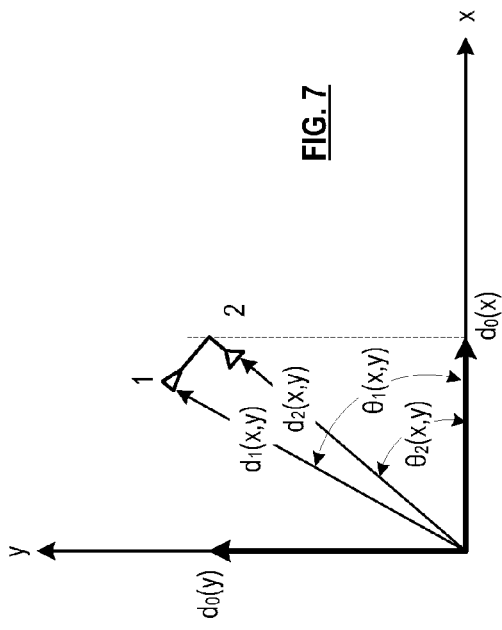
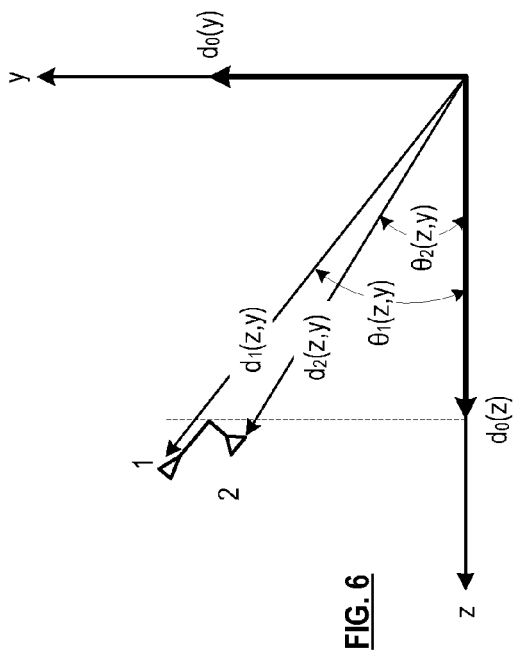
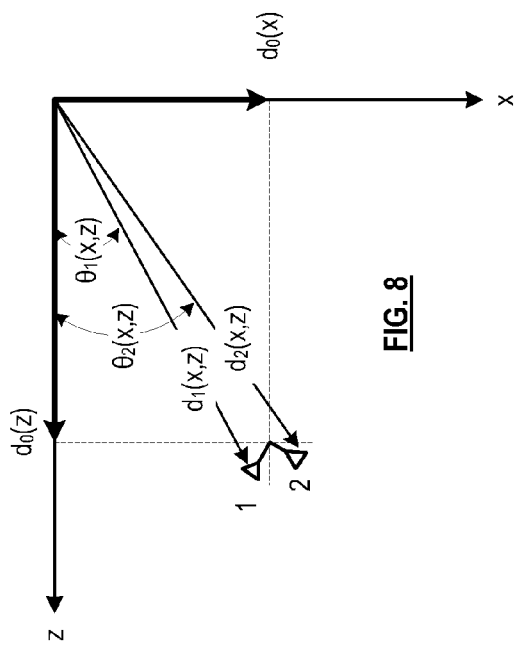
FIG. 7
FIG. 6
FIG. 8

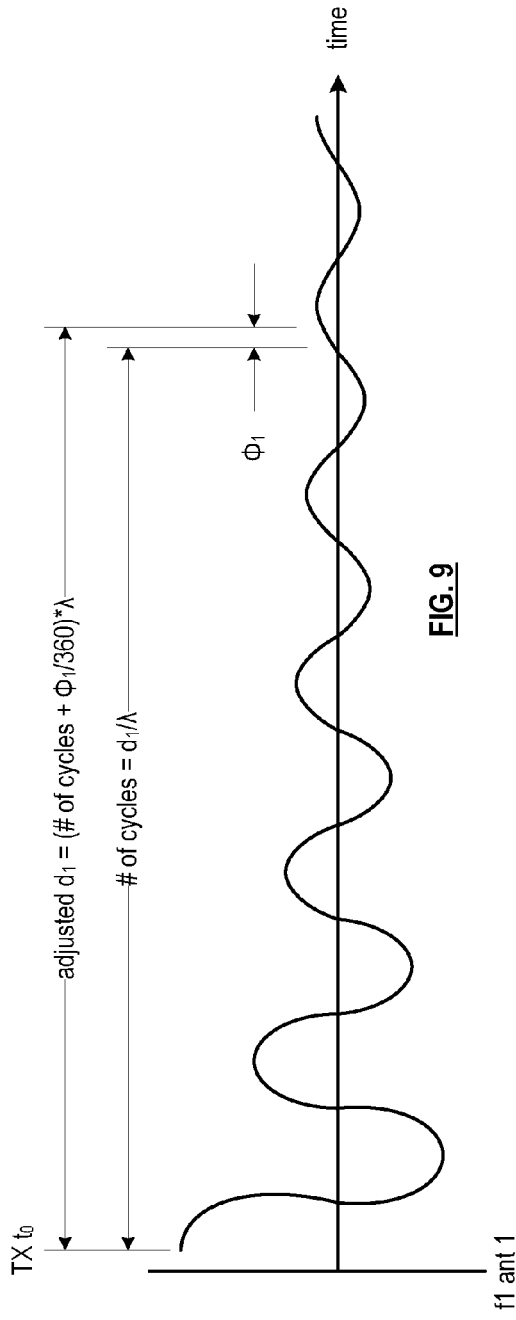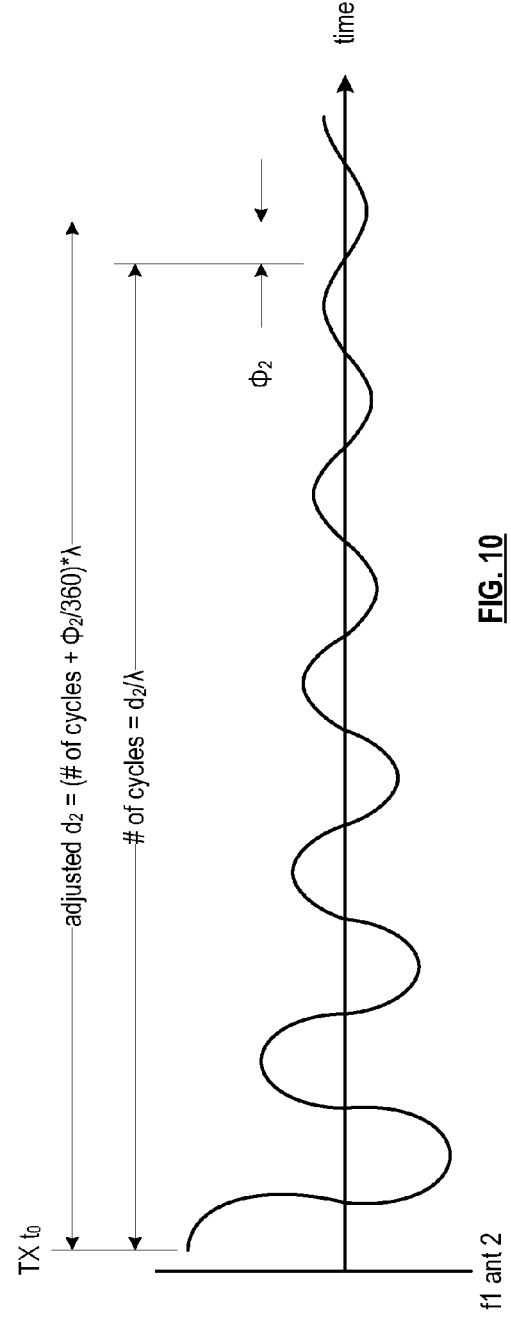

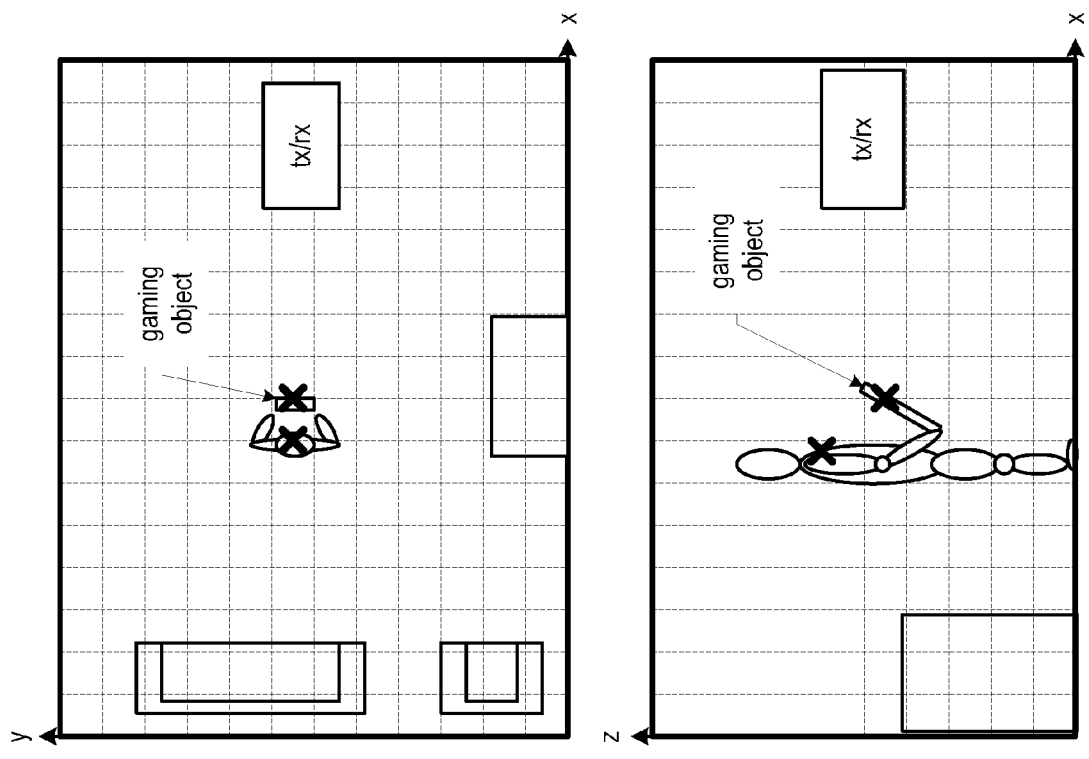
FIG. 15
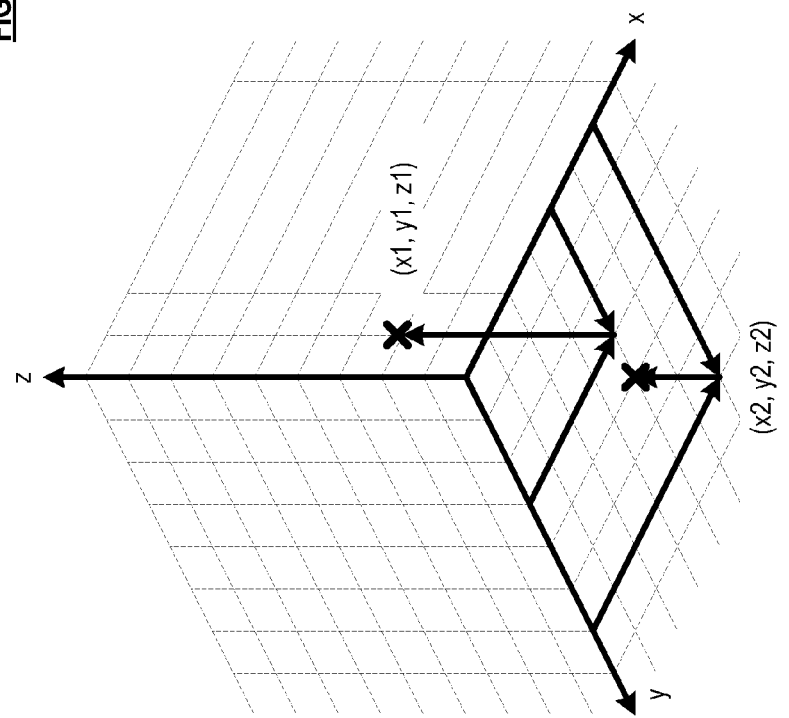
FIG. 16
FIG. 14

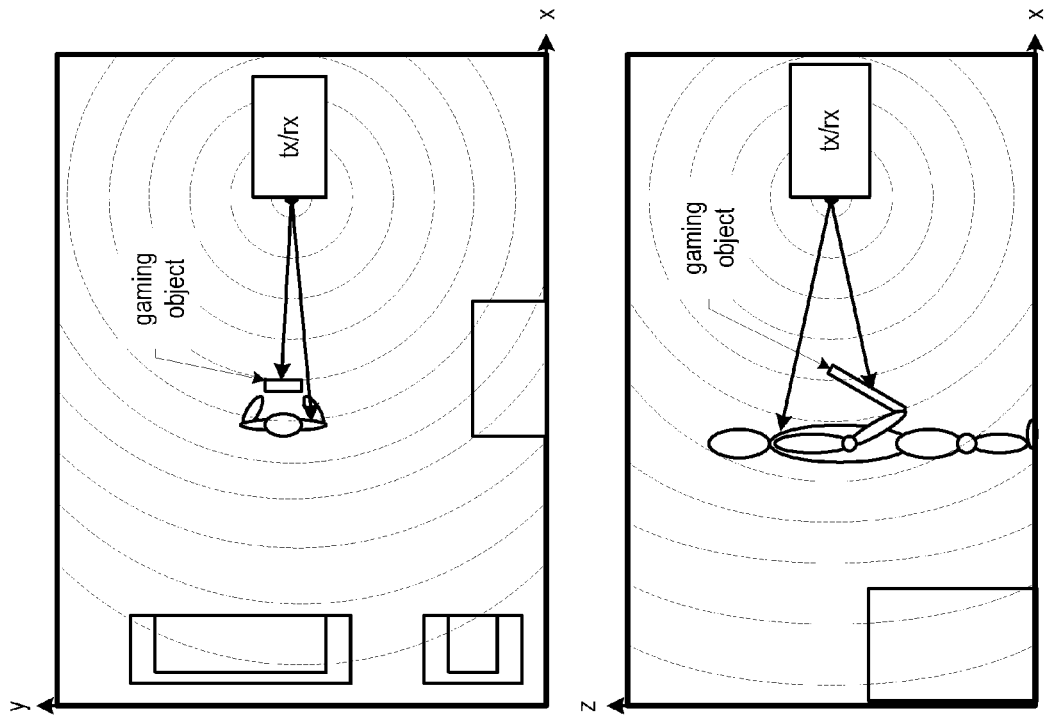
FIG. 18
FIG. 19
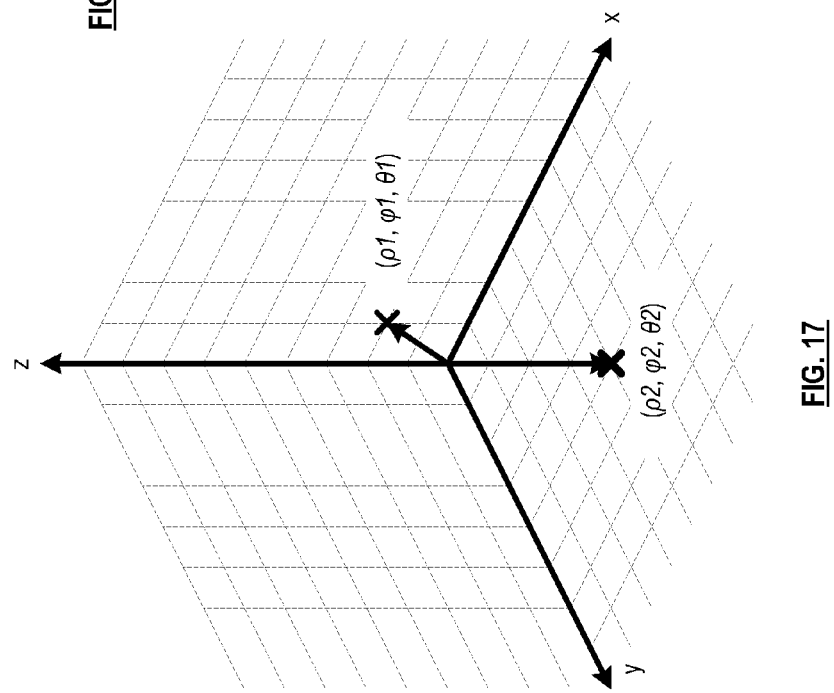
FIG. 17

APPARATUS FOR POSITION DETECTION USING MULTIPLE ANTENNAS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility Application Ser. No. 12/128,810, entitled "APPARATUS FOR POSITION DETECTION USING MULTIPLE ANTENNAS," filed May 29, 2008, now issued as U.S. Pat. No. 8,031,121, on Oct. 4, 2011, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/936,724, entitled "POSITION AND MOTION TRACKING OF AN OBJECT,", filed Jun. 22, 2007, expired.

TECHNICAL FIELD

This invention relates generally to wireless systems and more particularly to determining position within a wireless system and/or tracking motion within the wireless system.

DESCRIPTION OF RELATED ART

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most RF applications, radio transceivers are implemented on one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

In a particular application, millimeter wave (MMW) communications are used in public safety applications to detect a metal object on a moving person. This can be accomplished because millimeter wave signals penetrate clothing, plastics, and fabrics, but are reflected by metal objects. The responses of the MMW signals are captured and processed utilizing a statistical model to detect the metal object.

In radar applications, RF signals are used to detect the relative distance of an object. In general, when the receiver and transmitter are in the same location, the received power declines as the fourth power of the range, which can be use to determine the distance to an object. The transmission of the RF signals may be polarized to reduce interferences and/or to better detect certain objects. For instance, circular polarization is used to minimize the interference caused by rain; linear polarization for better detection of metal surfaces; and random polarization for better detecting fractal surfaces. Alternatively, the radar signals may be FM modulated to improve distance detect.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used in video games to detect the direction in which a game controller is pointed. As an example, an IR sensor is placed near the game display, where the IR sensor detects the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above video gaming technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

Therefore, a need exists for improved motion tracking and positioning determination for video gaming and other applications.

BRIEF DESCRIPTION OF THE SEVERAL VIEWS OF THE DRAWING(S)

FIG. 2 is a diagram of an example of receiving a HCF signal for determining position in accordance with the present invention;

FIG. 3 is a diagram of an example of a path loss model in accordance with the present invention;

FIGS. 6-8 are diagrams of another example of determining position in accordance with the present invention;

FIGS. 9 and 10 are diagrams of examples of updating distances in accordance with the present invention;

FIGS. 14-16 are diagrams of an embodiment of a coordinate system of a gaming system in accordance with the present invention; and FIGS. 17-19 are diagrams of another embodiment of a coordinate system of a gaming system in accordance with the present invention.

DETAILED DESCRIPTION OF THE DRAWINGS

Figure 1:
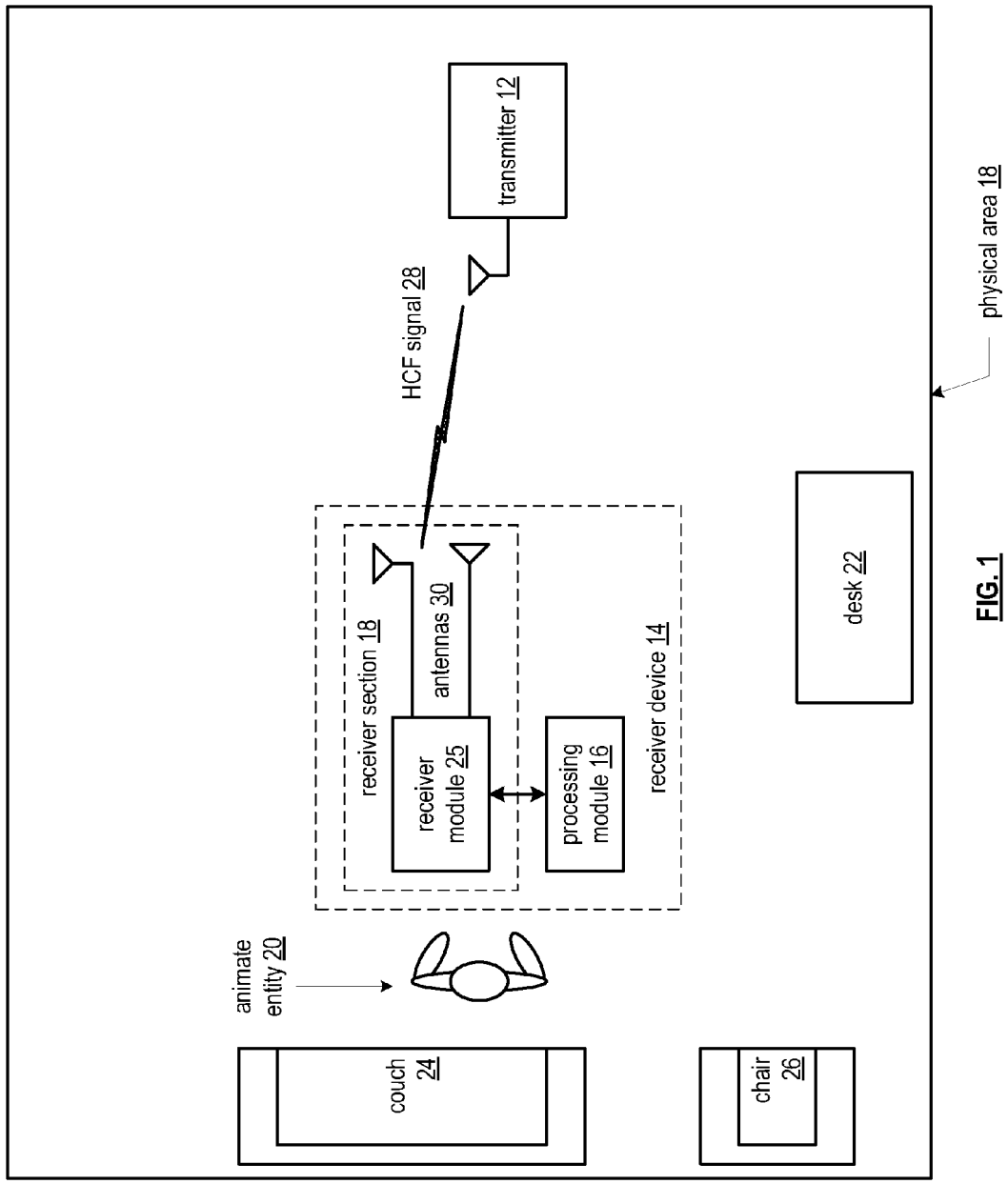
FIG. 1 is a schematic block diagram of an embodiment of an apparatus for determining position in accordance with the present invention.

FIG. 1 is a schematic block diagram of an embodiment of an apparatus that includes a transmitter 12 and a receiver device 14. The receiver device 14 includes a processing module 16 and a receiver section 18, which includes a receiver module 25 and a plurality of antennas 30 (e.g., two or more).

The apparatus is located within a physical area 18 that is a confined area such as a room, an office, etc. or an unconfined area such as a section of an airport, mall, outdoors, etc. Also located within the physical area 18 may be a plurality of inanimate objects (e.g., desk 22, couch 24, chair 26, walls, floor, ceiling, trees, etc.) and one or more animate objects 20 (e.g., a person, a dog, a cat, etc.). Typically, the receiver device 14 will be associated with an animate object 20.

The transmitter 12 transmits a high carrier frequency (HCF) signal 28. The HFC signal 28 may be a sinusoidal signal, a pulse signal, a beamformed signal, and/or a frequency modulated signal that has a carrier frequency in the radio frequency (RF) band (30 Hz to 3 GHz) and/or the microwave frequency band (3 GHz to 300 GHz). The transmitter 12 may continually transmit the HCF signal 28, may periodically transmit the HCF signal 28 (e.g., 10-50 millisecond intervals), or may randomly transmit the HCF signal 28.

To generate a sinusoidal signal, the transmitter 12 includes a signal generator, one or more power amplifiers, and one or more antennas. The signal generator generates a sinusoidal signal [e.g., $A_0 \cos(\omega_{RF}(t))$, where RF corresponds to the desired carrier frequency]. The one or more power amplifiers amplify the sinusoidal signal to produce one or more amplified signals, which are transmitted as the HCF signal 28 via the one or more antennas.

To generate a beamformed HCF signal (which may be focused to target a particular region of the physical area in three dimensions), the transmitter section 12 includes a plurality of antennas that transmit a high carrier frequency (HCF) signal in accordance with particular beamforming coefficients and/or phase offsets. The combination of the plurality of HCF signals in air produces the HCF beamformed signal 28 for this particular region in three-dimensional space. For example, a signal generator generates a signal [e.g., $A_0 \cos(\omega_{RF}(t))$, where RF corresponds to the desired carrier frequency]. The signal is routed to a plurality of phase offset modules that introduce a different phase offset (e.g., $\phi_n$) to produce a plurality of high carrier frequency signals [e.g., $A_0 \cos(\omega_{RF}(t)+\phi_0); A_0 \cos(\omega_{RF}(t)+\phi_1); \ldots; A_0 \cos(\omega_{RF}(t)+\phi_n)$]. The plurality of high carrier frequency signals are amplified via power amplifiers and transmitted via a plurality of antennas. The signals combine in air to produce the high carrier frequency signal 28.

To generate a frequency modulated signal, the transmitter 12 includes a signal generator, a frequency modulator, one or more power amplifiers, and one or more antennas. The signal generator generates a sinusoidal signal [e.g., $A_0 \cos(\omega_{RF}(t))$, where RF corresponds to the desired carrier frequency]. The frequency modulator modulates the signal to produce a frequency modulated (FM) signal [e.g., $A_0 \cos(\omega_{RF}(t)+\omega_1(t))$]. The one or more power amplifiers amplify the FM signal to produce one or more amplified signals, which are transmitted as the HCF signal 28 via the one or more antennas.

To generate a pulse signal, the transmitter 12 includes a pulse generator, one or more power amplifiers, and one or more antennas. The pulse generator generates a pulse signal having a particular (or varying) pulse width and/or a particular (or varying) pulse repetition times. The one or more power amplifiers amplify the pulse signal to produce one or more amplified signals, which are transmitted as the HCF signal 28 via the one or more antennas.

The antennas 30 of the receiver section 18 receive the high carrier frequency (HCF) signal 28 to produce first and second received high carrier frequency signals. The antennas 30 (in this example: two antennas) have an antenna radiation relationship such that the antennas 30 receive the HFC signal 28 differently. The antenna radiation relationship may be a spatial diversity relationship (e.g., the antennas are physically spaced by a known distance in three-dimensions), a polarization relationship (e.g., orthogonal polarization, circular polarization, random polarization, etc.), and/or a structural relationship (e.g., the antennas are of different types such as helical, mono-pole, di-pole, etc.).

The receiver module 25 determines first signal properties of the first received high carrier frequency signal and second signal properties of the second received high carrier frequency signal. The first and second signal properties include one or more of received signal strength, frequency shift, phase shift, and/or antenna properties (e.g., polarization, physical position, type, etc.).

In an embodiment, the receiver module 25 may be a separate device from the processing module 16 or may be the same device. The receiver module 25 and/or the processing module 16 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The receiver module 25 and/or the processing module 16 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the receiver module 25 and/or the processing module 16 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the receiver module 25 and/or the processing module 16 executes, hard coded and/or operational instructions corresponding to at least some of the steps and/or functions illustrated in FIGS. 1-19.

The processing module determines a position of the receiver device 14 with respect to the transmitter 12 based on the first and second signal properties. For example, the processing module 16 may determine the distance between the transmitter 12 and the receiver device 14 based on the known transmit power levels of the HCF signal 28 and the received power levels of the HCF signal 28. Since the signal 28 travel at the speed of light and the received power declines according to a path loss model (e.g., ITU indoor path loss mode), the distance between the receiver device 14 and the transmitter can be readily calculated. In addition, the processing module 16 determines a beam angle between the transmitter 12 and the receiver device 14 based on the first and second signal properties. From the distance and the beamform angle, the position of the receiver device 14 with respect to the transmitter 12 can be determined. The position of the receiver device 14 is then mapped to a coordinate system for the physical area 18. Examples of coordinate systems will be discussed with reference to FIGS. 14-19.

In another embodiment, the receiver section includes four antennas 30 that have an antenna radiation relationship. Each of the antennas 30 receives the high carrier frequency signal 28 to produce a received high carrier frequency signal. The receiver module 25 determines first through fourth signal properties of the first through fourth received high carrier frequency signals. The processing module 16 determines the position of the receiver device 14 with respect to the transmitter 12 based on the first through fourth signal properties.

FIG. 2 is a diagram of an example of receiving a HCF signal 28 for determining position of the receiver device 14 with respect to the transmitter 12. In this example, the transmitter 12 transmits the HCF signal 28 as a sinusoidal signal [e.g., $A_0 \cos(\omega_{HCF0}(t))$, where $A_0$ is the amplitude and HCF0 is the carrier frequency]. Each of the antennas 30 receives the signal 28 in accordance with the antenna radiation relationship to produce a first received HCF signal 29 [e.g., $A_1 \cos(\omega_{HCF0}(t))$, where $A_1$ is the amplitude of the received signal and HCF0 is the carrier frequency] and a second received HCF signal 31 [e.g., $A_2 \sin(\omega_{HCF0}(t))$, where $A_2$ is the amplitude of the received signal and HCF0 is the carrier frequency]. In this example, the antenna radiation relationship is an orthogonal polarization.

The receiver module 25 determines the properties of the received HCF signals 29 and 31 by determining the representative received HFC signal 33. In this example, the representation signal 33 is a combination of the first and second received signals 29 and 31, which may be expressed as $A'_0 \cos(\omega_{HCF0}(t) + \theta_0(t) + \Phi_0(t))$, where $A'_0 = \sqrt{(A_1^2 + A_2^2)}$, $\theta_0(t)$ is the beam angle [e.g., $\tan^{-1}(A_1/A_2)$], and $\Phi_0(t)$ is the phase rotation. In this example, the properties are first and second amplitudes $A_1$ and $A_2$, the orthogonal relationship between the antennas, the resulting amplitude $A'_0$, the beam angle $\theta_0(t)$, and/or the phase rotation $\Phi_0(t)$.

The processing module 16 utilizes the properties of the received HFC signals 29 and 31 and the representative signal 33 to determine the distance between the first antenna and the transmitter 12 and the distance between the second antenna and the transmitter 12. The processing module 16 interprets the beam angle (i.e., the angle between the antennas 30 and the transmitter 12) with respect to the signal type of the HCF signal 28 (e.g., pulse, sinusoidal, beamformed, etc.). The processing module 16 then determines the position of the receiver device 14 based on the beam angle and the first and second distances.

FIG. 3 is a diagram of an example of a path loss model (e.g., ITU indoor path loss model, another model, or calculated by placing the receiver device at specific positions with respect to the transmitter, etc.) for a give carrier frequency of an HCF signal 28. For higher carrier frequencies, the power decreases more rapidly with distance and, for lower carrier frequencies, the power decreases less rapidly with distance. As such, by knowing the transmit power level and the receive power level for a given path loss model, the distance between the receiver device 14 and the transmitter 12 can be determined.

As a specific example, the transmit power is expressed as TX and the receive power for the representative signal 33 is expressed as $A'_0$. Based on the intersection of $A'_0$ with the curve provides an approximated distance d0. Note that the distance to each antenna may be determined based on its respective power level and $A'_0$ and d0 may be derived therefrom.

Figure 4:
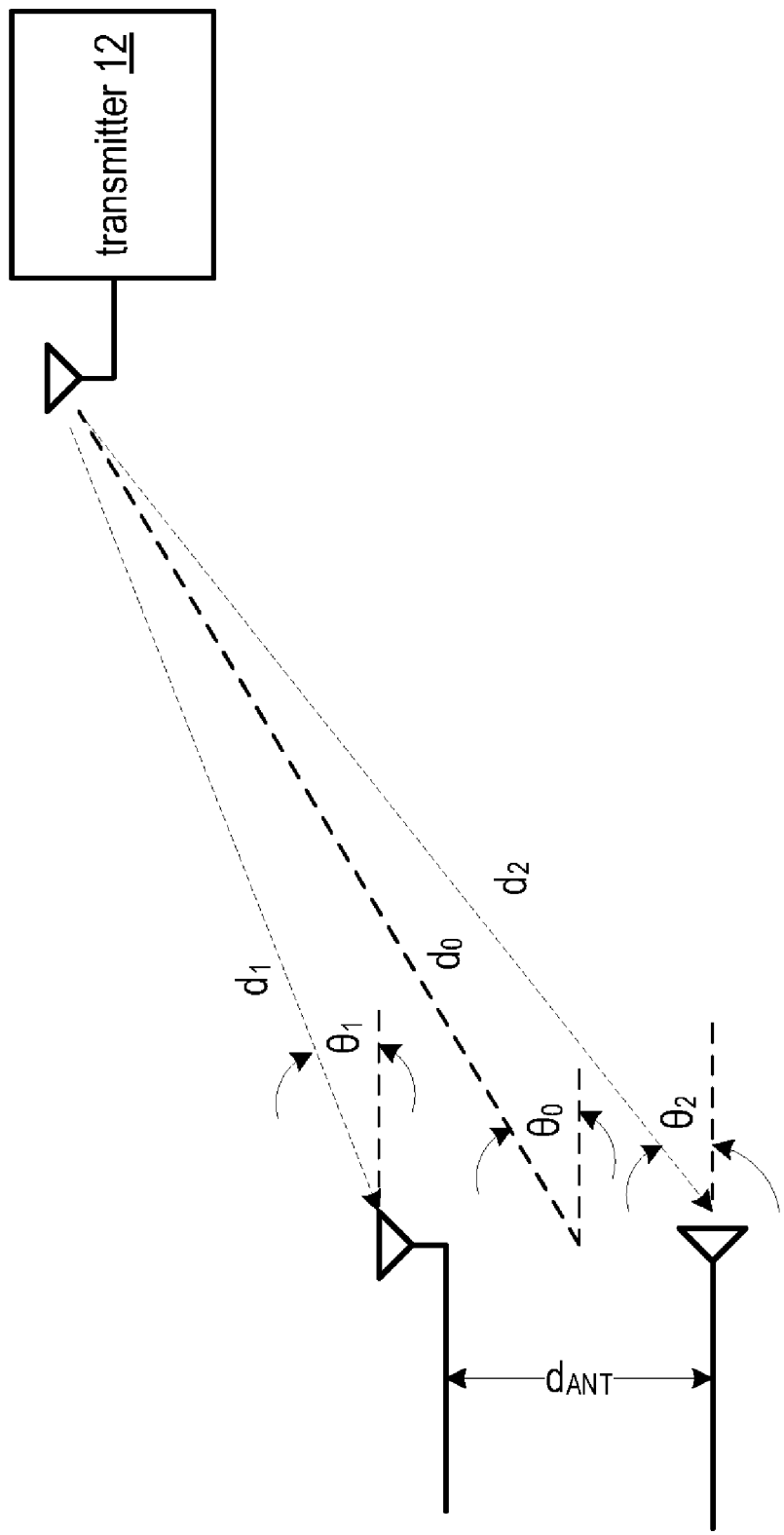
FIG. 4 is a diagram of another example of receiving an HCF signal in accordance with the present invention.

FIG. 4 is a diagram of an example of the distances between the receiver device 14 and the transmitter 12 for use in determining position of the receiver device. This example utilizes the path loss curve of FIG. 3 to determine $d_0$, the distance ($d_1$) between the first antenna and the transmitter 12, and the distance ($d_2$) between the second antenna and the transmitter 12. In addition, the distance ($d_{ANT}$) between the antennas known.

From these distances and the beam angle ($\theta_0$), beam angles ($\theta_1$ and $\theta_2$) can be determined for each antenna. With three known distances and beam angles, and if the HCF signal 28 is a beamformed signal, or the transmitter includes quadrant directional antennas, the position of the receiver device 14 with respect to the transmitter can be determined. If the transmitter 12 uses one or more omni-directional antennas, then the transmitter 12 includes at least three transmitter devices to transmit at least three HCF signals such that at least three sets of distances and beam angles are obtained. With the at least three sets of distances and beam angles, the position of the receiver device 14 with respect to the transmitter devices can be determined.

Figure 5:
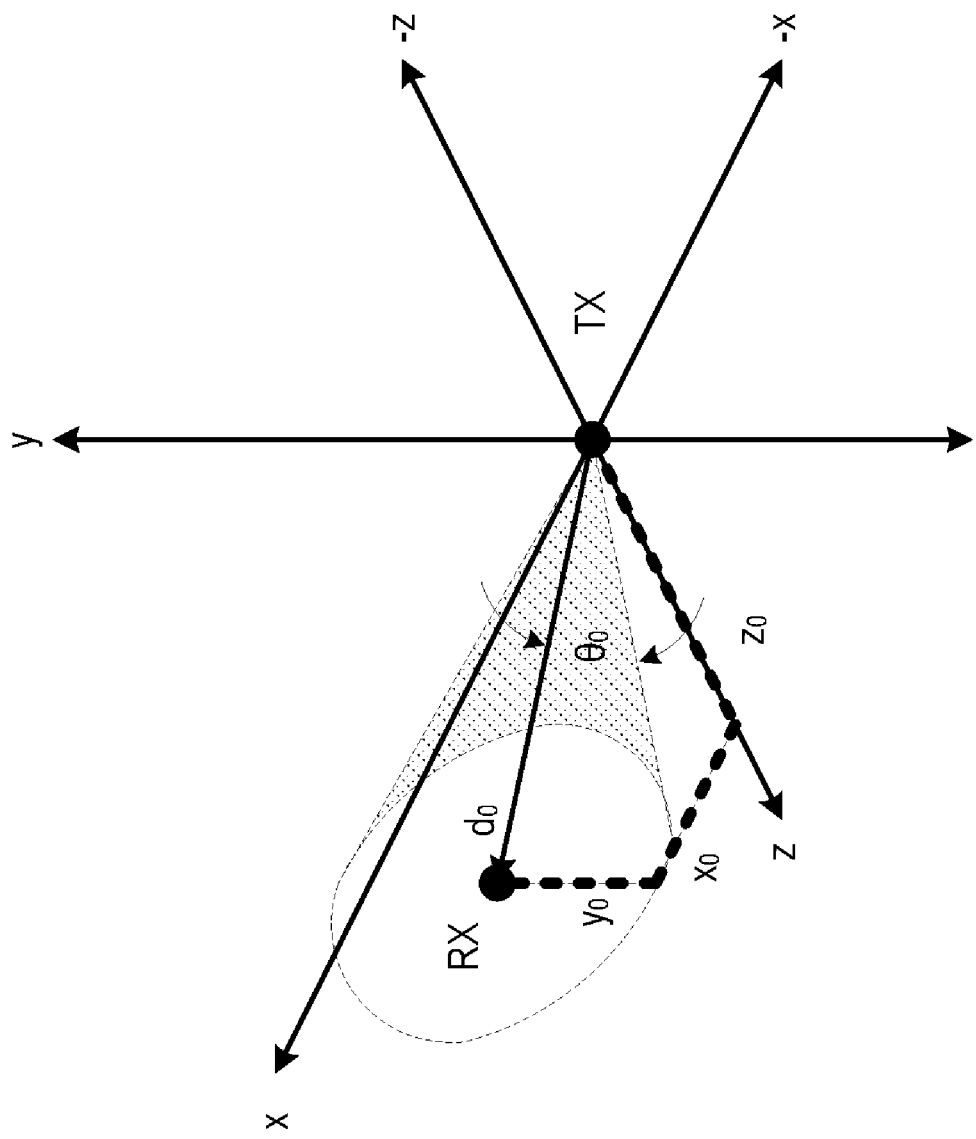
FIG. 5 is a diagram of an example of determining position in accordance with the present invention.

FIG. 5 is a diagram of an example of determining position in a Cartesian coordinate system. In this example, the transmitter 12 (TX) is positioned at the origin of the coordinate system, but could be at any point in the coordinate system. In this example, the receiver device 14 (RX) is in the positive x-y-z section at point ($x_0, y_0, z_0$), which is determined by the distance $d_0$ and the beam angle $\theta_0$. Note that the distance $d_0$ and the beam angle $\theta_0$ are three dimensional as illustrated with reference to FIGS. 6-8.

FIGS. 6-8 are Z-Y, X-Y, and X-Z diagrams of the example of determining position of the receiver device 14. In these Figures, the antennas (1 and 2) have a particular orientation in z-y space as shown. The common point of antennas (1 and 2) provides the reference point for which the representative signal 33 is received and from which the representative distance $d_0$ and representative beam angle $\theta_0$ are calculated. As such, representative distance $d_0$ is a function of $d_0(z,y)$, $d_0(x,y)$, and $d_0(x,z)$, which in turn are functions of $d_1(z,y)$ & $d_2(z,y)$, $d_1(x,y)$ & $d_2(x,y)$, and $d_1(x,z)$ & $d_2(x,z)$, respectively. Similarly, the representative beam angle $\theta_0$ is a function of $\theta_0(z,y)$, $\theta_0(x,y)$, and $\theta_0(x,z)$, which in turn are functions of $d_1(z,y)$ & $d_2(z,y)$, $d_1(x,y)$ & $d_2(x,y)$, and $d_1(x,z)$ & $d_2(x,z)$, respectively.

FIGS. 9 and 10 are diagrams of examples of updating distances based on the phase rotations. In FIG. 9, the signal received by the first antenna is shown with respect to when it was transmitted until it was received. As previously discussed, the distance between the transmitter 12 and the first antenna can be derived from the path loss curve of FIG. 3. Utilizing this information, the number of cycles of the signal that occurred between transmission and reception can be determined as distance divided by wavelength ($d_1/\lambda$). In most instances, this value will include an integer portion and a fraction portion.

The phase rotation ($\Phi_1$) may be determined by comparing the properties of the received signal with the known properties of the transmitted signal. For example, if the transmitted signal is a sinusoidal signal, then the phase rotation may be determined based on the magnitude of the signal and the number of cycles. From the number of cycles and the phase rotation, the distance between the first antenna and the transmitter may be updated as the number of cycles+phase rotation/360 degrees) times the wavelength [e.g., $d_1$=(# of cycles+$\Phi_1$/360)*$\lambda$].

In FIG. 10, the signal received by the second antenna is shown with respect to when it was transmitted until it was received. As previously discussed, the distance between the transmitter 12 and the second antenna can be derived from the path loss curve of FIG. 3. Utilizing this information, the number of cycles of the signal that occurred between transmission and reception can be determined as distance divided by wavelength ($d_1/\lambda$). In most instances, this value will include an integer portion and a fraction portion.

The phase rotation ($\Phi_2$) may be determined by comparing the properties of the received signal with the known properties of the transmitted signal. For example, if the transmitted signal is a sinusoidal signal, then the phase rotation may be determined based on the magnitude of the signal and the number of cycles. From the number of cycles and the phase rotation, the distance between the second antenna and the transmitter may be updated as the number of cycles+phase rotation/360 degrees) times the wavelength [e.g., $d_2$=(# of cycles+$\Phi_2$/360)*$\lambda$].

Figure 11:
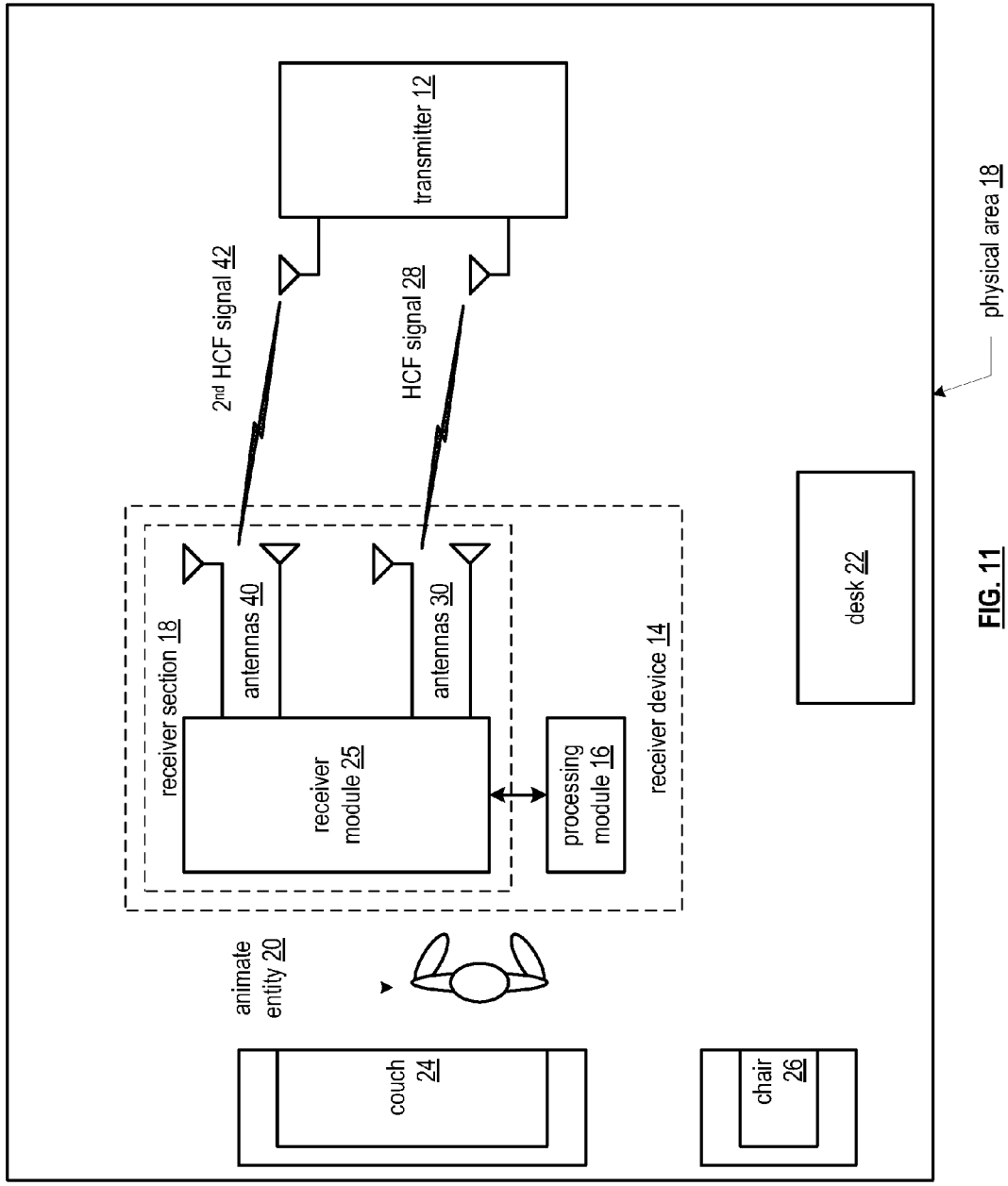
FIG. 11 is a schematic block diagram of another embodiment of an apparatus for determining position in accordance with the present invention.

FIG. 11 is a schematic block diagram of another embodiment of an apparatus for determining position that includes the transmitter 12 and the receiver device 14. The receiver device 14 includes a processing module 16 and a receiver section 18, which includes a receiver module 25 and a plurality of antennas 30 (e.g., four or more). The apparatus is located within a physical area 18 that is a confined area such as a room, an office, etc. or an unconfined area such as a section of an airport, mall, outdoors, etc. Also located within the physical area 18 may be a plurality of inanimate objects (e.g., desk 22, couch 24, chair 26, walls, floor, ceiling, trees, etc.) and one or more animate objects 20 (e.g., a person, a dog, a cat, etc.). Typically, the receiver device 14 will be associated with an animate object 20.

The transmitter 12 transmits a first high carrier frequency (HCF) signal 28 and a second HCF signal 42. Each of the HFC signals 28 and 42 may be a sinusoidal signal, a pulse signal, a beamformed signal, and/or a frequency modulated signal that has a carrier frequency in the radio frequency (RF) band (30 Hz to 3 GHz) and/or the microwave frequency band (3 GHz to 300 GHz). The transmitter 12 may continually transmit the HCF signals 28 and 42, may periodically transmit the HCF signals 28 and 42 (e.g., 10-50 milli-second intervals), may randomly transmit the HCF signals 28 and 42, or may alternate transmitting the first and second HCF signals 28 and 42. Regardless of the manner in which the HCF signals are transmitted, the second high carrier frequency signal 42 has a different carrier frequency than the first high carrier frequency signal 28. For example, the first HCF signal 28 may have a carrier frequency of 56 GHz and the second HCF signal 42 may have a carrier frequency of 64 GHz.

The antennas 30 and 40 of the receiver section 18 receive the high carrier frequency (HCF) signal 28 and the second HCF signal 42, respectively, to produce first and second received high carrier frequency signals and third and fourth received high carrier frequency signals, respectively. The antennas 30 (in this example: two antennas) have an antenna radiation relationship such that the antennas 30 receive the HFC signal 28 differently and the antennas 40 have a second antenna radiation relationship such that the antennas 40 receive the HFC signal 42 differently. The antenna radiation relationship may be a spatial diversity relationship (e.g., the antennas are physically spaced by a known distance in three-dimensions), a polarization relationship (e.g., orthogonal polarization, circular polarization, random polarization, etc.), and/or a structural relationship (e.g., the antennas are of different types such as helical, mono-pole, di-pole, etc.).

The receiver module 25 determines first signal properties of the first received high carrier frequency signal, second signal properties of the second received high carrier frequency signal, third signal properties of the third received high carrier frequency signal, and fourth signal properties of the fourth received high carrier frequency signal. The first through fourth signal properties include one or more of received signal strength, frequency shift, phase shift, and/or antenna properties (e.g., polarization, physical position, type, etc.).

The processing module determines a position of the receiver device 14 with respect to the transmitter 12 based on the first through fourth signal properties. For example, the processing module 16 may determine the distance between the transmitter 12 and the receiver device 14 based on the known transmit power levels of the HCF signal 28 and the received power levels of the HCF signals 28 and 42. Since the signals 28 and 42 travel at the speed of light and the received power declines according to a path loss model (e.g., ITU indoor path loss mode), the distance between the receiver device 14 and the transmitter can be readily calculated. In addition, the processing module 16 determines a beam angle between the transmitter 12 and the receiver device 14 based on the first through fourth signal properties. From the distance and the beamform angle, the position of the receiver device 14 with respect to the transmitter 12 can be determined. The position of the receiver device 14 is then mapped to a coordinate system for the physical area 18. Examples of coordinate systems will be discussed with reference to FIGS. 14-19.

In another embodiment, the receiver section includes four antennas 30 that have an antenna radiation relationship and fourth antennas 40 that have the second antenna radiation relationship. Each of the antennas 30 receives the high carrier frequency signal 28 to produce a received high carrier frequency signal and each of the antennas 40 receives the second HCF signal 42. The receiver module 25 determines first through eighth signal properties of the first through eighth received high carrier frequency signals. The processing module 16 determines the position of the receiver device 14 with respect to the transmitter 12 based on the first through fourth signal properties.

Figure 12:
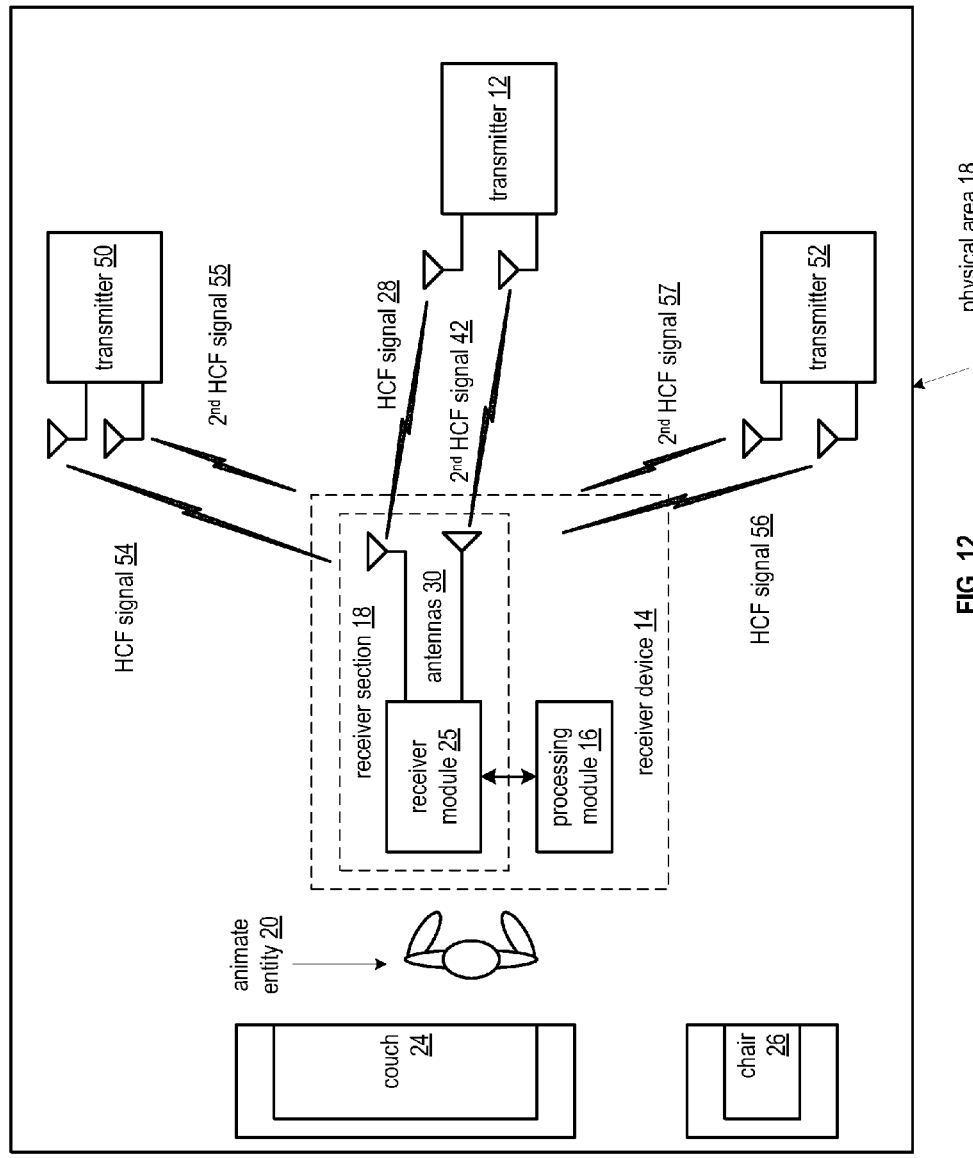
FIG. 12 is a schematic block diagram of another embodiment of an apparatus for determining position in accordance with the present invention.

FIG. 12 is a schematic block diagram of another embodiment of an apparatus that includes a plurality of transmitters 12, 50, 52, and a receiver device 14. The plurality of transmitters transmits, in accordance with a multiplexing protocol, a first high carrier frequency signal 28, 54, 56 and a second high carrier frequency signal 42, 55, 57, wherein the first high carrier frequency signal has a different carrier frequency than the second high carrier frequency signal. Each of the first and second HFC signals may be a sinusoidal signal, a pulse signal, a beamformed signal, and/or a frequency modulated signal that has a carrier frequency in the radio frequency (RF) band (30 Hz to 3 GHz) and/or the microwave frequency band (3 GHz to 300 GHz). The transmitters 12, 50, 52 may continually transmit the first and second HCF signals, may periodically transmit the HCF signals (e.g., 10-50 milli-second intervals), may randomly transmit the HCF signals, or may alternate transmitting the first and second HCF signals. Regardless of the manner in which the HCF signals are transmitted, the second high carrier frequency signal has a different carrier frequency than the first high carrier frequency signal. For example, the first HCF signal may have a carrier frequency of 56 GHz and the second HCF signal may have a carrier frequency of 64 GHz.

A first antenna of the antennas 30 receives the first high carrier frequency (HCF) signals 28, 54, 56 and the second antenna receives the second HCF signals 42, 55, 57 to produce a plurality of first received high carrier frequency signals and a plurality of second received high carrier frequency signals. The antennas 30 (in this example: two antennas) have an antenna radiation relationship such that the antennas 30 receive each of the first HFC signals differently. The antenna radiation relationship may be a spatial diversity relationship (e.g., the antennas are physically spaced by a known distance in three-dimensions), a polarization relationship (e.g., orthogonal polarization, circular polarization, random polarization, etc.), and/or a structural relationship (e.g., the antennas are of different types such as helical, mono-pole, di-pole, etc.).

The receiver module 25 determines first signal properties of the first received high carrier frequency signals and second signal properties of the second received high carrier frequency signals. The first and second signal properties include one or more of received signal strength, frequency shift, phase shift, and/or antenna properties (e.g., polarization, physical position, type, etc.).

The processing module determines a position of the receiver device 14 with respect to the transmitters 12, 50, 52 based on the first and second signal properties. For example, the processing module 16 may determine the distance between the transmitters 12, 50, 52 and the receiver device 14 based on the known transmit power levels of the plurality of first and second HCF signals and the received power levels of the plurality of first and second HCF signals. Since the signals travel at the speed of light and the received power declines according to a path loss model (e.g., ITU indoor path loss mode), the distance between the receiver device 14 and each of the transmitters can be readily calculated. In addition, the processing module 16 determines a beam angle between each of the transmitters 12 and the receiver device 14 based on the first and second signal properties. From the distances and the beamform angles, the position of the receiver device 14 with respect to the transmitters can be determined. The position of the receiver device 14 is then mapped to a coordinate system for the physical area 18. Examples of coordinate systems will be discussed with reference to FIGS. 14-19.

In another embodiment, each of the plurality of transmitters transmits, in accordance with the multiplexing protocol, a plurality of high carrier frequency signals, wherein each of the plurality of high carrier frequency signal has a different carrier frequency. The receiver section includes a plurality of antennas, where each of the plurality of antennas receives a corresponding one of the plurality of high carrier frequency signals from each of the plurality of transmitters to produce a plurality of corresponding received high carrier frequency signals.

The receiver module determines corresponding signal properties for each of the plurality of corresponding received high carrier frequency signals to produce a plurality of corresponding signal properties. The processing module determines the plurality of distances between the receiver device and the plurality of transmitters based on the plurality of corresponding signal properties.

Figure 13:
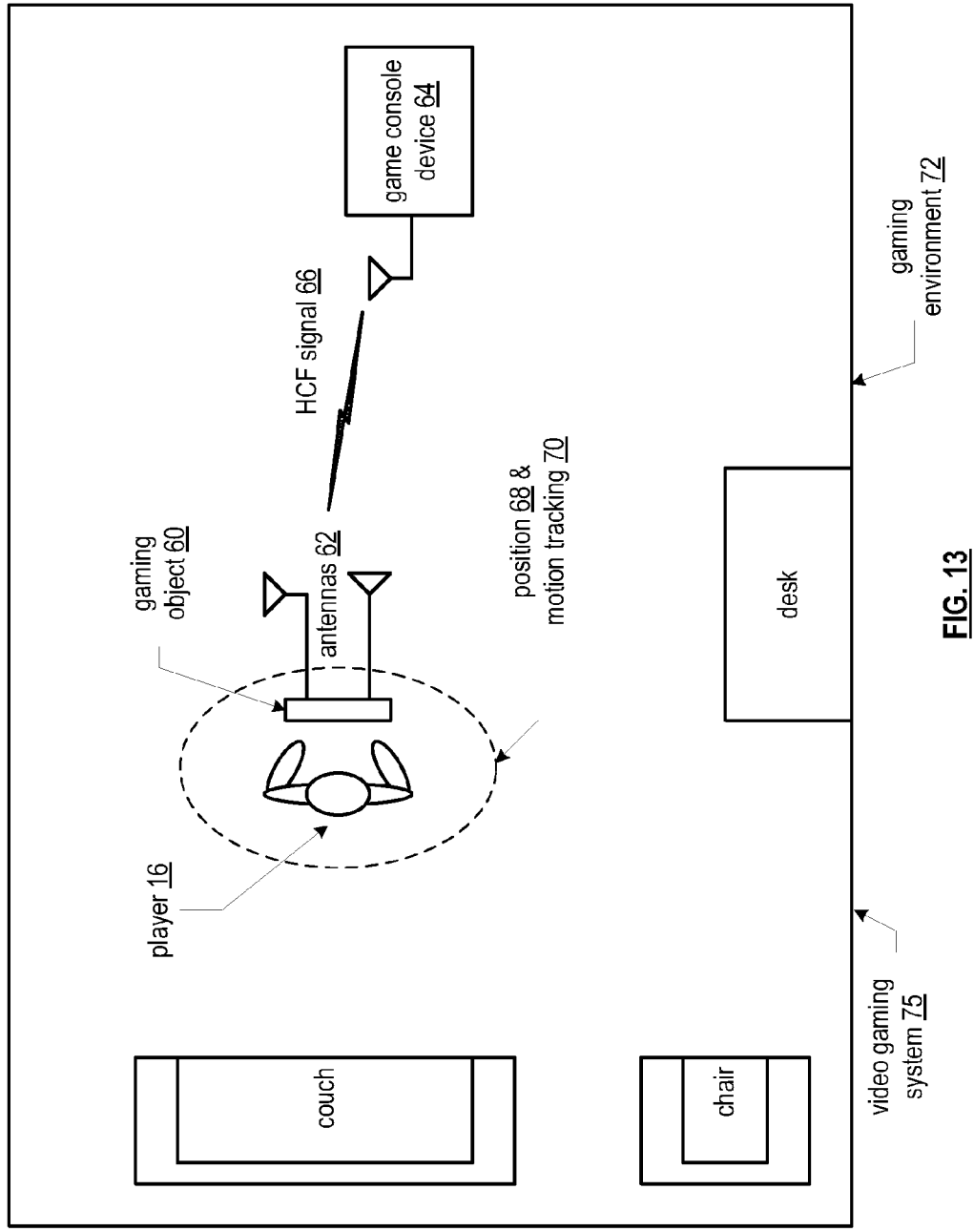
FIG. 13 is a schematic block diagram of an embodiment of a video game system in accordance with the present invention.

FIG. 13 is a schematic block diagram of an embodiment of a video game system 75 that includes a game console device 64 and a gaming object 60. The video game playing object 60 includes antennas 62 and a video game controller functionality. The first antenna of the antennas 63 receives a high carrier frequency signal to produce a first received high carrier frequency signal and the second antenna of the antennas 62 receives the high carrier frequency signal to produce a second received high carrier frequency signal. The first and second antennas have an antenna radiation relationship, which may be a spatial diversity relationship (e.g., the antennas are physically spaced by a known distance in three-dimensions), a polarization relationship (e.g., orthogonal polarization, circular polarization, random polarization, etc.), and/or a structural relationship (e.g., the antennas are of different types such as helical, mono-pole, di-pole, etc.).

The HCF signal 66 may be a sinusoidal signal, a pulse signal, a beamformed signal, and/or a frequency modulated signal that has a carrier frequency in the radio frequency (RF) band (30 Hz to 3 GHz) and/or the microwave frequency band (3 GHz to 300 GHz). The HCF signal 66 may be continually transmitted, periodically transmitted (e.g., 10-50 milli-second intervals), or randomly transmitted.

The video game playing object 62 further includes a receiver module that determines first signal properties of the first received high carrier frequency signal and second signal properties of the second received high carrier frequency signal. The signal properties include one or more of received signal strength, frequency shift, phase shift, and/or antenna properties (e.g., polarization, physical position, type, etc.).

The video game console device 64 also determines a position of the video game playing object 60 with respect to a source (e.g., the video game console device 64 and/or a transmitter 12) of the high carrier frequency signal based on the first and second signal properties. The video game console device 64 further functions to map the position 68 to a coordinate system and to track motion 70 of the gaming object 60 within the gaming environment 72.

In an embodiment, the video game console device receives the signals properties from the gaming object 60 and determines its position by determining a first distance between the first antenna and the source; determining a second distance between the second antenna and the source; determining a beam angle of the high carrier frequency signal with respect to the first and second antennas; and determining the position of the video game playing object 60 based on the beam angle and the first and second distances, wherein the first and second signal properties includes the beam angle. Alternatively, the video game playing object 60 could determine the distances and provide them to the video game console 64.

In various embodiments, video gaming system 75 may incorporate the various embodiments of the receiver device and the transmitter(s) of FIGS. 1-12 within the video game playing object 60 and/or the video game console 64. For example, the video game playing object may include four antennas 62 that have an antenna radiation relationship. Each of the antennas 62 receives the high carrier frequency signal 66 to produce a received high carrier frequency signal. As another example, the video game playing object may include a first antenna operable to receive a plurality of first high carrier frequency signals from a plurality of transmitters to produce a first plurality of received high carrier frequency signals and a second antenna operable to receive a plurality of the second high carrier frequency signals from a plurality of transmitters to produce a second plurality of received high carrier frequency signals.

FIGS. 14-16 are diagrams of an embodiment of a three-dimensional Cartesian coordinate system of a localized physical area that may be used for the physical area 18. In these figures an x-y-z origin is selected to be somewhere in the localized physical area and the position and motion of the player (e.g., an animate entity) and/or the gaming object is determined with respect to the origin (e.g., 0, 0, 0). For example, a point (e.g., x1, y1, z1) on the player is used to identify its position in the physical area and a point (e.g., x2, y2, z2) on the gaming object is used to identify its position in the physical area. As the player and/or gaming object move, its new position is identified within the physical area and the relation between the old point and the new point is used to determine three-dimensional motion.

FIGS. 17-19 are diagrams of an embodiment of a spherical coordinate system of a physical area. In these figures an origin is selected to be somewhere in the physical area and the position and motion of the player and/or the gaming object is determined with respect to the origin. For example, the position of the player may be represented as vector, or spherical coordinates, $(\rho, \phi, \theta)$, where $\rho \geq 0$ and is the distance from the origin to a given point P; $0 \leq \phi \leq 180°$ and is the angle between the positive z-axis and the line formed between the origin and P; and $0 \leq \theta \leq 360°$ and is the angle between the positive x-axis and the line from the origin to P projected onto the xy-plane. In general, $\phi$ is referred to as the zenith, colatitude or polar angle, $\theta$ is referred to as the azimuth. $\phi$ and $\theta$ lose significance when $\rho=0$ and $\theta$ loses significance when $\sin(\phi)=0$ (at $\phi=0$ and $\phi=180°$). A point is plotted from its spherical coordinates, by going $\rho$ units from the origin along the positive z-axis, rotate $\phi$ about the y-axis in the direction of the positive x-axis and rotate $\theta$ about the z-axis in the direction of the positive y-axis.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An apparatus comprises:
   a receiver device that includes:
      a receiver section that includes:
         a first antenna operable to receive a high carrier frequency signal to produce a first received high carrier frequency signal;
         a second antenna operable to receive the high carrier frequency signal to produce a second received high carrier frequency signal, wherein the first and the second antennas have an antenna radiation relationship;
      a receiver module configured to:
         determine first signal properties of the first received high carrier frequency signal, the first signal properties including a first phase rotation and a first number of cycles of the first received high carrier frequency signal; and
         determine second signal properties of the second received high carrier frequency signal, the second signal properties including a second phase rotation and a second number of cycles of the second received high carrier frequency signal; and
      a processing module configured to:
         determine a position of the receiver device with respect to a source of the high carrier frequency signal based on the first and the second signal properties; and
         map the position to a coordinate system.

2. The apparatus of claim 1, wherein the processing module is further configured to determine the position by:
   determine a beam angle of the high carrier frequency signal with respect to the first and second antennas; and
   determine the position of the receiver device based on the beam angle and the first and second distances, wherein the first and second signal properties includes the beam angle.

3. The apparatus of claim 1, wherein the antenna radiation relationship comprises at least one of:
   a spatial diversity relationship,
   a polarization relationship; and
   a structural relationship.

4. The apparatus of claim 1 further comprises:
   the receiver section further includes:
      a third antenna operable to receive a second high carrier frequency signal to produce a third received high carrier frequency signal;
      a fourth antenna operable to receive the second high carrier frequency signal to produce a fourth received high carrier frequency signal, wherein the third and fourth antennas have a second antenna radiation relationship;
   the receiver module is further coupled to:
      determine third signal properties of the third received high carrier frequency signal; and
      determine fourth signal properties of the fourth received high carrier frequency signal; and
   the processing module is further coupled to determine the position of the receiver device with respect to the source of the high carrier frequency signal based on the first, second, third, and fourth signal properties.

5. The apparatus of claim 1 further comprises:
   the receiver section further includes:
      a third antenna operable to receive the high carrier frequency signal to produce a third received high carrier frequency signal;
      a fourth antenna operable to receive the high carrier frequency signal to produce a fourth received high carrier frequency signal, wherein the first, second, third, and fourth antennas have the antenna radiation relationship;
   the receiver module is further configured to:
      determine third signal properties of the third received high carrier frequency signal; and
      determine fourth signal properties of the fourth received high carrier frequency signal; and
   the processing module is further configured to determine the position of the receiver device with respect to the source of the high carrier frequency signal based on the first through fourth signal properties.

6. An apparatus comprises:
   a plurality of transmitters, wherein each of the plurality of transmitters transmits a first high carrier frequency signal and a second high carrier frequency signal;
   a receiver device that includes:
      a receiver section that includes:
         a first antenna operable to receive a plurality of first high carrier frequency signals to produce a first plurality of received high carrier frequency signals;
         a second antenna operable to receive a plurality of second high carrier frequency signals to produce a second plurality of received high carrier frequency signals;
      a receiver module coupled to:
         determine a first plurality of signal properties of the first plurality of received high carrier frequency signals, the first plurality of signal properties including a first phase rotation and a first number of cycles of the first received high carrier frequency signal; and
         determine a second plurality of signal properties of the second plurality of received high carrier frequency signals, the second plurality of signal properties including a second phase rotation and a second number of cycles of the second received high carrier frequency signal; and
      a processing module coupled to:
         determine a plurality of distances between the receiver device and the plurality of transmitters based on the first and second plurality of signal properties, wherein a distance of the plurality of distances is between the receiver device and one of the plurality of transmitters and is determined based on a corresponding one of the first plurality of signal properties and a corresponding one of the second plurality of signal properties;
         determine a position of the receiver device with respect to a transmitter of the plurality of transmitters on the first and the second plurality of signal properties; and
         map the position to a coordinate system.

7. The apparatus of claim 6, wherein the processing module is further configured to determine the distance between the receiver device and the one of the plurality of transmitters by:
   determining a first receive power of a corresponding one of the plurality of the first high carrier frequency signals received via the first antenna;

determining a first path loss between the first antenna and the corresponding one of the plurality of transmitters based on the first receive power and a first transmit power;

determining a second receive power of a corresponding one of the plurality of the second high carrier frequency signals received via the second antenna;

determining a second path loss between the second antenna and the corresponding one of the plurality of transmitters based on the second receive power and a second transmit power; and determining the distance based on the first and second path losses.

8. The apparatus of claim 6 further comprises:

the receiver section includes a plurality of antennas, wherein the plurality of antennas includes the first and second antennas, wherein each of the plurality of antennas receives a corresponding one of the plurality of high carrier frequency signals from each of the plurality of transmitters to produce a plurality of corresponding received high carrier frequency signals;

the receiver module determines corresponding signal properties for each of the plurality of corresponding received high carrier frequency signals to produce a plurality of corresponding signal properties; and the processing module determine the plurality of distances between the receiver device and the plurality of transmitters based on the plurality of corresponding signal properties.

9. The apparatus of claim 6, wherein the processing module is further configured to determine the position by:

determining a beam angle of the high carrier frequency signal with respect to the first and second antennas; and determine the position of the receiver device with respect to the transmitter of the plurality of transmitters based on the beam angle and the first and second distances, wherein the first and second signal properties includes the beam angle.

10. The apparatus of claim 6, wherein the receiver section further comprises:

a third antenna operable to receive a second high carrier frequency signal to produce a third received high carrier frequency signal;

a fourth antenna operable to receive the second high carrier frequency signal to produce a fourth received high carrier frequency signal, wherein the third and fourth antennas have a second antenna radiation relationship;

the receiver module is further coupled to:

determine third signal properties of the third received high carrier frequency signal; and determine fourth signal properties of the fourth received high carrier frequency signal; and the processing module is further coupled to determine the position of the receiver device with respect to the source of the high carrier frequency signal based on the first, second, third, and fourth signal properties.

11. The apparatus of claim 10, wherein:

the third signal properties include a first phase rotation and a first number of cycles of the third received high carrier frequency signal; and the fourth signal properties include a second phase rotation and a second number of cycles of the fourth received high carrier frequency signal.

12. The apparatus of claim 6, wherein:

the first and the second antennas have an antenna radiation relationship; and the antenna radiation relationship includes at least one of:
a spatial diversity relationship,
a polarization relationship; and
a structural relationship.

13. The apparatus of claim 6, wherein the coordinate system includes a spherical coordinate system to a physical area.

14. The apparatus of claim 6, wherein the coordinate system includes a Cartesian coordinate system to a physical area.

15. A video game system comprises:

a video game playing object that includes:

a first antenna operable to receive a high carrier frequency signal to produce a first received high carrier frequency signal;

a second antenna operable to receive the high carrier frequency signal to produce a second received high carrier frequency signal, wherein the first and second antennas have an antenna radiation relationship;

a receiver module configured to:

determine first signal properties of the first received high carrier frequency signal, the first signal properties including a first phase rotation and a first number of cycles of the first received high carrier frequency signal; and determine second signal properties of the second received high carrier frequency signal, the second signal properties including a second phase rotation and a second number of cycles of the second received high carrier frequency signal; and a video game console device configured to:

determine a position of the video game playing object with respect to a source of the high carrier frequency signal based on the first and second signal properties; and map the position to a coordinate system.

16. The video game system of claim 15, wherein the video game console device is further configured to determine the position by:

determine a first distance between the first antenna and the source;

determine a second distance between the second antenna and the source;

determine a beam angle of the high carrier frequency signal with respect to the first and second antennas;

determine the position of the video game playing object based on the beam angle and the first and second distances, wherein the first and second signal properties includes the beam angle.

17. The video game system of claim 16, wherein the video game console device is further configured to:

determine the first distance by:

determining a first receive power of the high carrier frequency signal received via the first antenna;

determining a first path loss between the first antenna and the source based on the first receive power and a transmit power; and determining the first distance based on the first path loss, wherein the first signal properties includes the first receive power and the first path loss; and determine the second distance by:

determining a second receive power of the high carrier frequency signal received via the second antenna;

determining a second path loss between the second antenna and the source based on the second receive power and the transmit power; and determining the second distance based on the second path loss, wherein the second signal properties includes the second receive power and the second path loss.

18. The video game system of claim 15 further comprises:
the video game playing object further includes:
- a third antenna operable to receive a second high carrier frequency signal to produce a third received high carrier frequency signal, wherein the second high carrier frequency signal has a different carrier frequency than the high carrier frequency signal;
- a fourth antenna operable to receive the second high carrier frequency signal to produce a fourth received high carrier frequency signal, wherein the third and fourth antennas have a second antenna radiation relationship;

the receiver module is further coupled to:
- determine third signal properties of the third received high carrier frequency signal; and
- determine fourth signal properties of the fourth received high carrier frequency signal; and the video game console device is further coupled to determine the position of the video game playing object with respect to the source based on the first, second, third, and fourth signal properties.

19. The video game system of claim 15 further comprises:
the video game playing object further includes:
- a third antenna operable to receive the high carrier frequency signal to produce a third received high carrier frequency signal;
- a fourth antenna operable to receive the high carrier frequency signal to produce a fourth received high carrier frequency signal, wherein the first, second, third, and fourth antennas have the antenna radiation relationship;

the receiver module is further configured to:
- determine third signal properties of the third received high carrier frequency signal;
- determine fourth signal properties of the fourth received high carrier frequency signal; and the video game console device is further configured to determine the position of the receiver device with respect to the source based on the first through fourth signal properties.

20. The apparatus of claim 15, wherein the coordinate system includes a spherical coordinate system to a physical area.

* * * * *

UNITED STATES PATENT AND TRADEMARK OFFICE
CERTIFICATE OF CORRECTION

PATENT NO. : 8,289,212 B2  
APPLICATION NO. : 13/223121  
DATED : October 16, 2012  
INVENTOR(S) : Ahmadreza Rofougaran et al.

Page 1 of 1

It is certified that error appears in the above-identified patent and that said Letters Patent is hereby corrected as shown below:

In the Claims

Col. 13, line 38, in claim 2: replace "determine" with --determining--  
Col. 13, line 40, in claim 2: replace "determine" with --determining--  
Col. 13, line 53, in claim 4: after "signal;" insert --and--  
Col. 14, line 5, in claim 5: after "signal;" insert --and--  
Col. 14, line 13, in claim 5: after "signal;" delete "and"  
Col. 16, line 13, in claim 15: after "frequency signal;" insert --and--  
Col. 16, line 40, in claim 16: replace "determine" with --determining--  
Col. 16, line 42, in claim 16: replace "determine" with --determining--  
Col. 16, line 44, in claim 16: replace "determine" with --determining--  
Col. 16, line 45, in claim 16: after "second antennas;" insert --and--  
Col. 16, line 46, in claim 16: replace "determine" with --determining--  
Col. 17, line 11, in claim 18: after "frequency signal;" insert --and--  
Col. 18, line 5, in claim 19: after "frequency signal;" insert --and--  
Col. 18, line 13, in claim 19: after "frequency signal;" insert --and--

Signed and Sealed this  
Third Day of December, 2013

Margaret A. Focarino  
*Commissioner for Patents of the United States Patent and Trademark Office*